(12) United States Patent
Goss et al.

(10) Patent No.: US 12,100,306 B2
(45) Date of Patent: Sep. 24, 2024

(54) EFFICIENT COMPUTER-STORAGE OF OBSTACLE DATA FOR RENDERING IN A MAP VIEW

(71) Applicant: The Boeing Company, Chicago, IL (US)

(72) Inventors: Linnea Goss, Raymond, ME (US); Christopher Andrew Docking, Shropshire (GB); Travis Scott Clayton Root, Austin, TX (US)

(73) Assignee: The Boeing Company, Arlington, VA (US)

( * ) Notice: Subject to any disclaimer, the term of this patent is extended or adjusted under 35 U.S.C. 154(b) by 340 days.

(21) Appl. No.: 17/644,025

(22) Filed: Dec. 13, 2021

(65) Prior Publication Data

US 2023/0186778 A1 Jun. 15, 2023

(51) Int. Cl.
*G08G 5/00* (2006.01)
*G08G 5/04* (2006.01)

(52) U.S. Cl.
CPC .......... *G08G 5/0086* (2013.01); *G08G 5/0021* (2013.01); *G08G 5/045* (2013.01)

(58) Field of Classification Search
CPC .... G08G 5/0086; G08G 5/0021; G08G 5/045; G01C 21/3881; G06T 15/00; G06F 16/29
See application file for complete search history.

(56) References Cited

U.S. PATENT DOCUMENTS

| 2014/0141803 | A1* | 5/2014 | Marti | G01C 21/206 455/456.2 |
| 2015/0074151 | A1* | 3/2015 | Chaiken | G06F 16/221 707/803 |
| 2016/0356625 | A1* | 12/2016 | O'Beirne | G09B 29/008 |

(Continued)

FOREIGN PATENT DOCUMENTS

KR 20110000349 A 1/2011

OTHER PUBLICATIONS

"Data Compression: Bit-Packing 101 (/News/2016/9/6/Data-Compression-Bit-Packing-101)," KinematicSoup Technologies Inc., Available Online at https://www.kinematicsoup.com/news/2016/9/6/data-compression-bit-pa, Sep. 6, 2016, 17 pages.

(Continued)

*Primary Examiner* — Jason Holloway
(74) *Attorney, Agent, or Firm* — Alleman Hall & Tuttle LLP

(57) ABSTRACT

Examples are disclosed that relate to efficient computer-storage and computer-rendering of obstacle data in the computer-generated map view. In one example, one or more vector tiles collectively representing a geographic region are received. Each of the one or more vector tiles represents a sub-region of the geographic region. Obstacle data for one or more obstacles in the geographic region is received. The obstacle data defines a location of each of the one or more obstacles in relation to a local origin of the vector tile representing the sub-region where the obstacle is geographi- (Continued)

cally located. A map view is rendered for visual presentation via a display. The map view includes the geographic region represented by the one or more vector tiles and indicating the one or more obstacles.

20 Claims, 6 Drawing Sheets

(56) References Cited

U.S. PATENT DOCUMENTS

| | | | |
|---|---|---|---|
| 2020/0158529 A1 | 5/2020 | Zhang et al. | |
| 2021/0056855 A1* | 2/2021 | Goss | G08G 5/0034 |

OTHER PUBLICATIONS

Martinelli, L. et al., "Updatable Vector Tiles from OpenStreetMap," Bachelor Thesis, University of Applied Science Rapperswil, Department of Computer Science, Jun. 16, 2016, 76 pages.

Fernandes, R. et al., "TrafficDB: HERE's High Performance Shared-Memory Data Store," Proceedings of the VLDB Endowment, vol. 9, No. 13, Sep. 1, 2016, 12 pages.

European Patent Office, Extended European Search Report Issued in Application No. 22212717.7, May 12, 2023, Germany, 7 pages.

\* cited by examiner

| | VECTOR TILE DATABASE 214 | | | |
|---|---|---|---|---|
| | ZOOM LEVEL | TILE COLUMN | TILE ROW | TILE DATA BLOB |
| | 4 | 3 | 8 | [BLOB] |
| | 4 | 2 | 9 | [BLOB] |
| | ⋮ | ⋮ | ⋮ | ⋮ |
| | 8 | 1 | 1 | [BLOB] |

EFFICIENT COMPUTER-STORAGE OF OBSTACLE DATA FOR RENDERING IN A MAP VIEW

FIELD

The present disclosure relates generally to computer-storage and computer-rendering of map data for visual presentation in a map view, and more specifically, to computer-storage and computer-rendering of obstacle data in a map view.

BACKGROUND

Numerous obstacles of various heights can potentially pose an impediment to aircraft flying along different flight paths. For example, there are on the order of millions of obstacles all across the world that can potentially impede different flight paths of aircraft. In this example, obstacles can include any suitable type of human-formed structure, including but not limited to, buildings, towers, bridges, suspended cables, etc. In order to avoid any such obstacles from becoming an impediment to a flight path, a significant number of obstacles are tracked in a computer database. However, tracking such a large number of obstacles creates a large amount of obstacle data (e.g., point geospatial data) that can consume significant computer-storage resources.

SUMMARY

Examples are disclosed that relate to efficient storage and rendering of obstacle data in a computer-generated map view. In one example, one or more vector tiles collectively representing a geographic region are received. Each of the one or more vector tiles represents a sub-region of the geographic region. Obstacle data for one or more obstacles in the geographic region is received. The obstacle data defines a location of each of the one or more obstacles in relation to a local origin of the vector tile representing the sub-region where the obstacle is geographically located. A map view is rendered for visual presentation via a display. The map view includes the geographic region represented by the one or more vector tiles and indicating the one or more obstacles.

The features, functions, and advantages that have been discussed can be achieved independently in various embodiments or may be combined in yet other embodiments further details of which can be seen with reference to the following description and drawings.

DETAILED DESCRIPTION

Storing obstacle data (e.g., point geospatial data) corresponding to a large number of obstacles (e.g., on the order of millions) consumes significant computer-storage resources (both working memory (e.g., random access memory (RAM)) and static memory (e.g., read-only memory (ROM)). For example, obstacle data may be encoded in a variety of text-based or geospatial formats that result in a significantly large data packet size per obstacle. Further, rendering such a large number of obstacles in a map view can be computationally intensive.

According to one approach, a number of obstacles rendered in a map view is geographically bounded or otherwise filtered to reduce an amount of obstacle data that is rendered in the map view. As one example, instead of rendering all obstacles stored in a database in a map view, a filter is applied to limit obstacles rendered in a map view. For example, obstacles may be filtered by geographic region (e.g., only render obstacles located in California) or by height (e.g., only render obstacles that are over 200 feet tall). However, such an approach prevents some obstacles from being rendered in the map view. In some instances, these missing obstacles could be an impediment to an aircraft flying along a flight path.

To address these and other issues, the present description is directed to an approach for storing obstacle data in format that allows for computationally efficient rendering of obstacle data in a computer-generated map view. In one example, vector tiles are used to place the obstacle data in a format where locations of obstacles geographically located in a region represented by a vector tile are set to a local origin of the vector tile. Defining the locations of the obstacles locally relative to the corresponding vector tiles reduces the size of the numerical values representing these locations relative to obstacle locations that are defined in terms of a geospatial format (e.g., defined in terms of latitude and longitude). Moreover, defining the locations of the obstacles in this manner allows for suitable location precision of obstacles to be maintained in order to accurately position obstacles in a computer-generated map view. In some examples, such an approach may be leveraged to render large-scale data sets of obstacles in a computer-generated map view so that the obstacles may be identified and avoided by an aircraft flying along a flight path.

Figure 1:
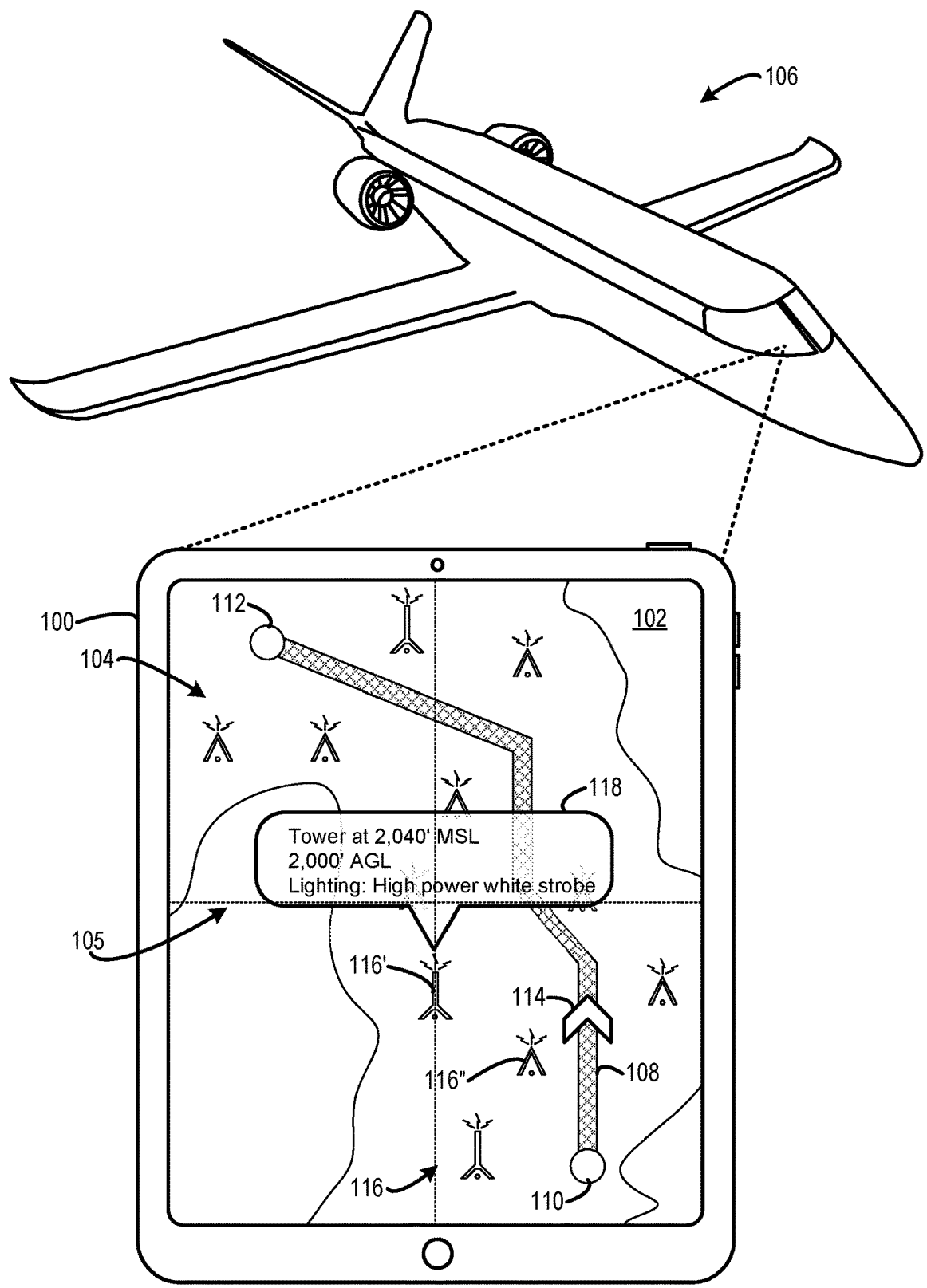
FIG. 1 shows an example embodiment of a map view of a geographic region indicating a plurality of obstacles.

FIG. 1 shows an example embodiment of a computer 100 that is configured to render a map view 102 of a geographic region 104 that may be used (e.g., for reference during flight of an aircraft 106 to avoid obstacles in the geographic region 104). The computer 100 may take any suitable form, including but not limited to an embedded computer mounted in a cockpit of an aircraft, a mobile computer (e.g., a tablet, smartphone, or virtual-, augmented-, or mixed-reality computer), a desktop computer, a network-accessible cloud computer, or another suitable type of computer.

The geographic region 104 rendered in the map view 102 may have any suitable size. The map view 102 may be rendered using one or more vector tiles 105 that collectively represent the geographic region 104. In particular, each of the one or more vector tiles 105 may represent a sub-region of the geographic region 104. In the illustrated example, the geographic region 104 is made up of four vector tiles. Note that the vector tiles 105 are indicated by dotted lines that need not be rendered in the map view 102.

In some examples, the geographic region 104 may be defined by a zoom level of a standardized zoom scale. For example, according to such a zoom scale, at the lowest zoom level zero, the geographic region 104 rendered in the map view 102 may include the entire Earth. As the zoom level increases, the geographic region 104 rendered in the map view 102 may become smaller and smaller. For example, at zoom level 7, the geographic region may be 313,086.2 square meters.

Each vector tile 105 includes vector data defining a relative location of the vector tile in relation to a plurality of vector tiles that collectively define a geographic region (e.g., a state, a country, a continent, Earth), and a zoom level of the vector tile. The vector tiles 105 are rendered in the map view 102 based on the vector data.

In some instances, a dimension or zoom level of the vector tiles 105 may be selected to fit particular dimensions of a display in which the map view 102 is rendered. In some instances, a vector tile may include a portion of a geographic sub-region that extends outside of the geographic region 104 rendered in the map view 102, and that portion may be clipped or otherwise not included when rendering the map view 102.

In the illustrated example, the map view 102 indicates a pre-planned flight path 108 for the aircraft 106 across the geographic region 104. The flight path 108 includes an origin 110 and a destination 112. The map view 102 further indicates a current position 114 of the aircraft 106 in the geographic region 104. For example, the computer 100 may be configured to determine the current position 114 of the aircraft 106 based on sensor data (e.g., global position system (GPS), satellite data, cellular data) of the computer 100 or another sensing and/or computing system.

Further, the map view 102 indicates a plurality of obstacles 116 located throughout the geographic region 104. Different obstacles may be represented by different symbols based on characteristics of the obstacles. For example, an obstacle 116' may have an above-ground-level (AGL) height over a threshold AGL height, and thus is represented by an elongated symbol. An obstacle 116" may have an AGL height below the threshold AGL height, and thus is represented by a more compact symbol that differs from the elongated symbol representing the obstacle 116'. The plurality of obstacles 116 may be represented by any suitable symbols based on any suitable characteristics that allow different obstacles having different characteristics to be distinguished from one another.

The computer 100 may be configured to selectively visually present obstacle-related information corresponding to different obstacles in the map view 102 to provide more detailed information about any given obstacle. For example, the computer 100 may be configured to receive user input indicating selection of an obstacle in the map view 102, such as obstacle 116'. Further, the computer 100 may be configured to render obstacle-related information in the form of one or more characteristics of the selected obstacle in the map view 102 based on the user input.

In the illustrated example, an overlay 118 is visually presented in the map view 102 based on selection of the obstacle 116'. The overlay 118 indicates obstacle characteristics including an obstacle type (e.g., Tower), a mean-sea-level (MSL) height (e.g., 2,040 feet), an AGL height (e.g., 2,000 feet), and an obstacle lighting status (e.g., High power white strobe). The computer 100 may be configured to selectively present any suitable type of obstacle-related information for an obstacle in the map view 102.

The overlay 118 may be selectively visually presented in any suitable manner. In one example, the overlay 118 may be visually presented for a designated period (e.g., 5 seconds) after the obstacle 116' is selected via user input. In another example, the obstacle 116' may be de-selected (e.g., via a tap input) to remove the overlay 118 from the map view 102. In another example, an overlay may be selectively visually presented for an obstacle based on the aircraft 106 coming within a threshold distance of a geographic location of the obstacle. Further, the overlay may be removed from the map view based on the aircraft 106 traveling a threshold distance away from the geographic location of the obstacle.

In some embodiments, the map view 102 may include different layers that may be selectively visually presented to display different types of information. For example, such layers may include obstacle information, topographical information, flight traffic information, satellite photographic information, weather information, and other types of information. In some examples, the different layers may be toggled to selectively show the different types of information in the map view 102.

As discussed above, a large number of obstacles that are identified across a geographic region may generate an enormous amount of obstacle data (e.g., point geospatial data) when tracked using a conventional geospatial format. Such a large amount of obstacle data makes rendering of obstacles in a map view computationally expensive. Accordingly, a computer may be configured to employ an approach for storing obstacle data in a memory efficient format in which locations of obstacles geographically located in a region represented by a vector tile are set to a local origin of the vector tile. Defining the locations of the obstacles locally relative to the corresponding vector tiles reduces the size of the numerical values representing these locations relative to obstacle locations that are defined in terms of a geospatial format that must independently define the location with sufficient data to uniquely identify the location without reference to other locations.

Figure 2:
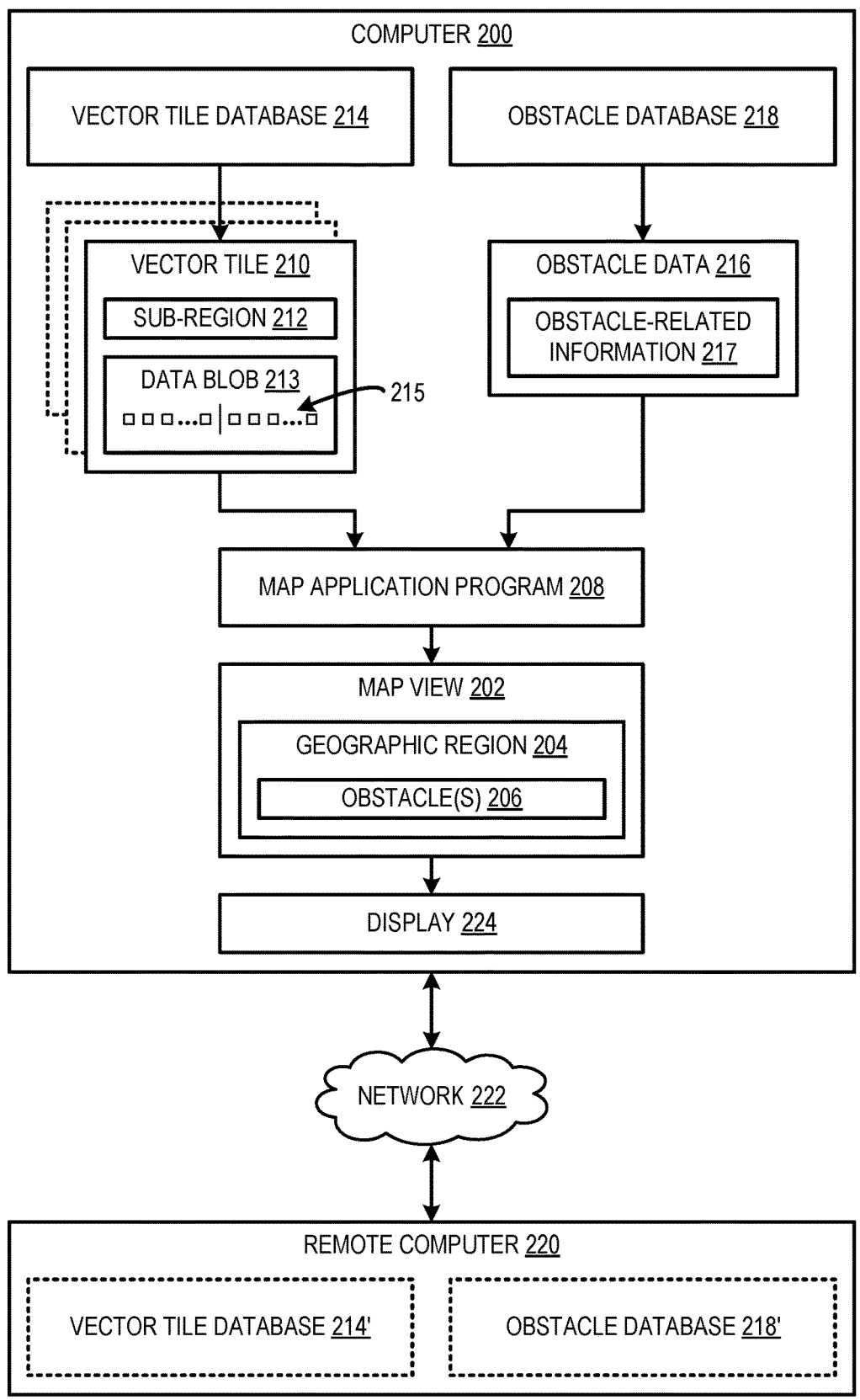
FIG. 2 shows a block diagram of an example embodiment of a computer configured to render a map view of a geographic region indicating one or more obstacles.

FIG. 2 shows a block diagram of an example embodiment of a computer 200 configured to render a map view 202 of a geographic region 204 indicating one or more obstacles 206 using the herein described approach. In one example, the computer 200 represents the computer 100 shown in FIG. 1. In the illustrated embodiment, the computer 200 is configured to execute a map application program 208 that is configured to render the map view 202 of the geographic region 204. The map application program 208 is configured to receive one or more vector tiles including vector tile 210. Each of the one or more vector tiles represents a different sub-region of the geographic region 204. For example, the vector tile 210 represents the sub-region 212. The one or more vector tiles collectively represent the geographic region 204. In some examples, each vector tile may represent different areas of land of a pre-defined size and location. For example, each vector tile may be square or another standard shape.

Each of the one or more vector tiles may include a data blob useable by the map application program 208 to render obstacles present in the geographic sub-region corresponding to the vector tile. For example, the vector tile 210 includes a data blob 213 that is usable by the map application program 208 to render obstacles present in the geographic sub-region 212. In some implementations, the data blob 213 includes one or more continuous sequences of bits 215 each having a uniform bit size and corresponding to a different obstacle present in the geographic sub-region 212 corresponding to the vector tile 210. Each continuous sequence of bits represents the obstacle data for the corresponding obstacle. In one example, every sequence of 64 bits may correspond to obstacle data for a different obstacle. In other implementations, the data blob 213 may take the form of a pointer to an externally stored data blob.

The map application program 208 is configured to, upon receiving a data blob for a vector tile, parse the data blob according to the uniform bit size to extract each of the one or more continuous sequences of bits corresponding to the different obstacles. The map application program 208 may be configured to recognize the obstacle data for each obstacle from the parsed sequences of bits to render a symbol visually representing the obstacle (and optionally other obstacle-related information e.g., height, type, lighting status) at appropriate locations in the map view 202.

Figures 3, 4:
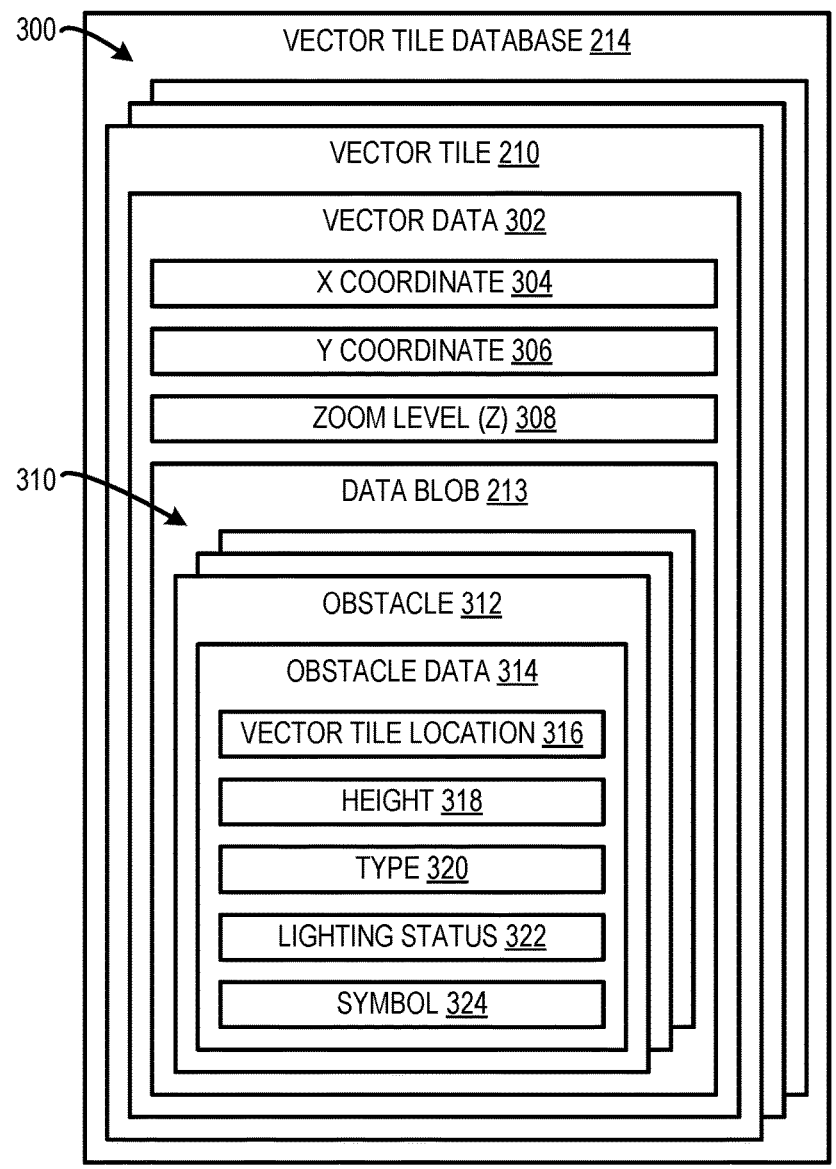
FIG. 3 shows a block diagram of an example embodiment of a vector tile database.
FIG. 4 shows an example arrangement of the vector tile database shown in FIG. 3.

The map application program 208 may receive vector tiles from a vector tile database 214. FIG. 3 shows a block diagram of an example embodiment of the vector tile database 214. The vector tile database 214 includes a plurality of vector tiles 300. Vector tiles provide an efficient mechanism for delivering map data in manageable data packets from the vector tile database 214 to the map application program 208. In particular, vector data is clipped to the boundaries of each vector tile, whereas raster tiles include pre-rendered bit maps of images. The vector data is typically much smaller than a corresponding rendered bit map allowing for more efficient storage of the vector tiles and less computationally intensive rendering of the map view 202 based on the vector tiles relative to a map view rendered based on raster tiles. Also, using vector tiles allows for different layers of information to be selectively rendered to allow for customization of the map view 202, which is not the case for a map view rendered using raster tiles because the raster tiles are pre-rendered bit maps. For example, obstacles may be selectively rendered as a layer in the map view 202 along with any other desired layers (e.g., 3D terrain map data, a satellite image, flight traffic, weather, or other relevant information). Moreover, styling of the map view 202 rendered based on vector tiles can be applied later in the rendering process relative to a map view rendered using raster tiles allowing for much greater flexibility in how the map view is visually presented.

The vector tile 210 is shown as an example vector tile of the plurality of vector tiles 300 stored in the vector tile database 214. The vector tile 210 includes vector data 302 that may be used to render the vector tile 210 in the map view 202 shown in FIG. 2. Note that vector data 302 may be stored using any suitable data structure.

FIG. 4 shows an example arrangement of the vector tile database 214. In the illustrated example, the vector tile database 214 includes vector tiles for zoom levels 4 to 8, although additional or fewer zoom levels may be stored in different implementations. In some implementations, beyond a particular zoom level (e.g., zoom level 8), the map application program 208 may be configured to translate vector data of a vector tile to align with that zoom level (e.g., zoom level 8). The vector tile database 214 includes a plurality of rows 400 corresponding to different vector tiles. The vector tile database 214 includes a first column 402 to store an X coordinate value of a vector tile, a second column 404 to store a Y coordinate value of the vector tile, a third column 406 to store a zoom level or Z value, and a fourth column 408 to store a data blob containing obstacle-related information for obstacles located in a sub-region of the vector tile. The map application program 208 in FIG. 2 reads obstacle-related information (e.g., location, type, lighting information, symbol) out of the data blob to situate each obstacle symbol with reference to the vector tile's local origin in the map view 202.

Vector data is discussed herein in relation to rendering of vector tiles and obstacles within those vector tiles. In some embodiments, the vector data 302 can define other relevant information not discussed herein that may be visually presented in the map view 202 (e.g., satellite imaging overlays, 3D terrain map data, a bitmap satellite image, flight traffic, weather, or other relevant information).

The vector data 302 defines a relative location of the vector tile 210 in relation to the plurality of vector tiles 300. For example, the relative location may be defined in terms of an X coordinate 304 and a Y coordinate 306 of a grid collectively formed by the plurality of vector tiles 300. The X and Y coordinates 304, 306 indicate the position of the vector tile 210 relative to the other vector tiles in the grid. A set of vector tiles may be arranged in any suitable manner and the location of each vector tile may be defined relative to the other vector tiles in the arrangement.

The vector data 302 defines a zoom level 308 of the vector tile 210. In some examples, the zoom level 308 may be defined based on a standardized zoom level scale. For example, the zoom level scale may include 23 zoom levels, with 0 being the lowest zoom level (fully zoomed out) and 22 being the highest (fully zoomed in). At lower zoom levels, a small set of vector tiles covers a larger geographical area. At higher zoom levels, a larger set of vector tiles covers a smaller geographical area. In some examples, all vector tiles in a set may have the same zoom level. Further, in some examples, the vector tile database 214 may be configured to store a plurality of sets of vector tiles and each set of vector tiles may have a different zoom level that is the same for each vector tile in the set.

The vector data 302 includes the data blob 213 that includes continuous sequences of bits for a plurality of obstacles 310 geographically located in the sub-region 212 of the vector tile 210. An obstacle 312 is shown as an example obstacle of the plurality of obstacles 310. A continuous sequence of bits for the obstacle 312 is represented by obstacle data 314 that defines obstacle-related information for the obstacle 312. In particular, the obstacle data 314 defines obstacle-related information including a vector tile location 316, height information 318, a type 320, a lighting status 322, and a symbol 324.

The vector tile location 316 defines a location of the obstacle 312 in relation to a local origin of the vector tile 210 representing the sub-region 212 where the obstacle 312 is geographically located. In some examples, the location of the obstacle 312 may be defined by a pair of coordinate delta values that are relative to the local origin of the corresponding vector tile 210. In some such examples, each coordinate delta value may be normalized along an axis of the corresponding vector tile.

In one example, a hypothetical vector tile has a first corner positioned at 24.527135 latitude/−104.062500 longitude and a second opposing corner positioned at 27.059126 latitude/−101.25 longitude. In the geographic sub-region of the hypothetical vector tile, an obstacle is located at 27.048713 longitude/−101.324016 latitude. However, the vector tile location for the obstacle is stored as X and Y delta values relative to the origin of the hypothetical vector tile. The X and Y delta values may be normalized in a range from 0-1 to provide a percentage along the X and Y axes of the vector tile at which the obstacle is situated. In this example, $\Delta X=0.973683$ (97.3683%) and $\Delta Y=0.995888$ (99.5888%). In this example, the normalized delta values may be stored as 17 bits to provide location precision of 0.00000762945 relative to the zoom level of the vector tile.

In other examples, an obstacle location may be defined with a different precision level or a different format that is defined in relation to the local origin of the corresponding vector tile. In this example, the local origin is set as the top-left corner of the vector tile. The local origin of the vector tile may be designated as any suitable point (e.g., top-right corner, bottom-right corner, bottom-left corner, center) on the vector tile that is standardized from vector tile to vector tile.

Figure 5:
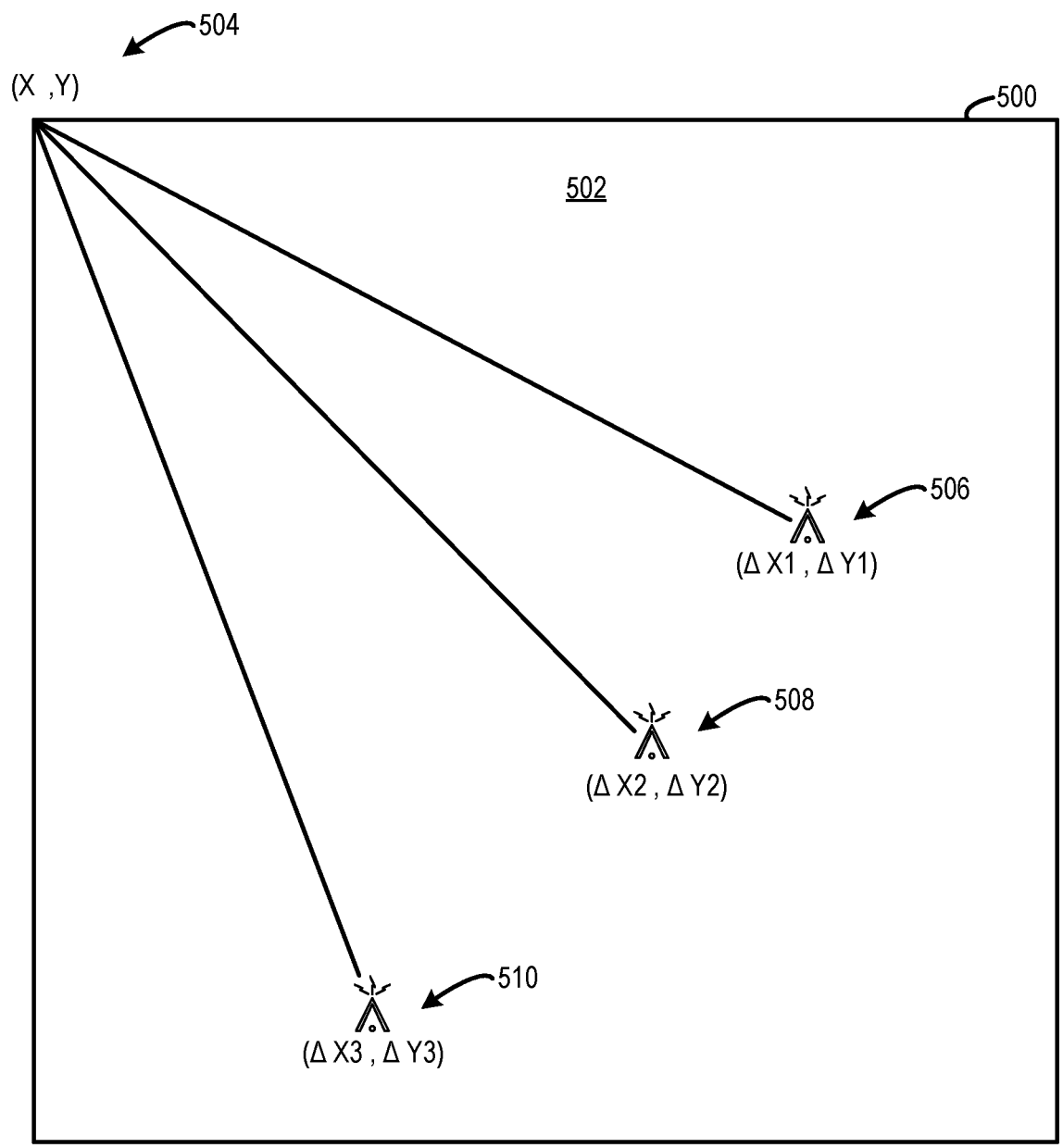
FIG. 5 shows an example visual representation of an embodiment of a vector tile representing a geographic region including a plurality of obstacles.

FIG. 5 shows an example embodiment of a vector tile 500 representing a geographic sub-region 502 including a plurality of obstacles having locations defined in terms of a local origin 504 of the vector tile 500. In this example, the local origin 504 is positioned in the top-left corner of the vector tile 500 and is labeled by X, Y coordinates that are geospatial coordinates. A first obstacle 506 is positioned in the geographic sub-region 502 at a first location that is defined by a first pair of coordinate delta values (ΔX1, ΔY1) that are defined in relation to the local origin 504 instead of being defined as geospatial coordinates. A second obstacle 508 is positioned in the geographic sub-region 502 at a second location that is defined by a second pair of coordinate delta values (ΔX2, ΔY2) that are defined in relation to the local origin 504 instead of being defined as geospatial coordinates. A third obstacle 510 is positioned in the geographic sub-region 502 at a third location that is defined by a third pair of coordinate delta values (ΔX3, ΔY3) that are defined in relation to the local origin 504 instead of being defined as geospatial coordinates. In some examples, for each of the first, second, and third obstacles, each coordinate delta value may be normalized along respective X and Y axes of the vector tile 500 to indicate the location of the obstacle.

By representing the locations of the obstacles in relation to the local origin of the vector tile instead of geospatial coordinates, the size of obstacle data that is stored and used for rendering the obstacles in a map view may be reduced relative to prior approaches because the data only has to define the relative position on the tile as opposed to the precise position anywhere on Earth.

Returning to FIG. 3, in some examples, the height 318 of the obstacle 312 may be defined as an above-ground-level (AGL) height. In some examples, the height 318 of the obstacle 312 may be defined as a mean-sea-level (MSL) height. In some examples, both AGL and MSL heights may be included as obstacle data 314 for the obstacle 312.

The type 320 of the obstacle 312 may include any suitable categorization of obstacles. Non-limiting examples include radio towers, antennas, power lines, bridges, buildings, and other types of obstacles.

The lighting status 322 of the obstacle 312 indicates whether or not the obstacle 312 is lit up. If the obstacle 312 is lit up, then the lighting status 322 defines the type of light that is emitted by the obstacle 312. Non-limiting examples include white strobe, solid red, or another type of lighting description.

The symbol 324 of the obstacle 312 defines the type of symbol that is used to visually represent the obstacle 312 in the map view 202. Any suitable symbol may be used to visually represent an obstacle. Non-limiting examples include an elongated tower, a compact tower, a triangle, or another type of shape.

In some embodiments, the obstacle data for each of the plurality of obstacles 310 need not be stored using data blobs. The obstacle data for each of the plurality of obstacles 310 may be stored using any suitable data structure. In some embodiments, the obstacle data for the plurality of obstacles 310 may include additional information that describes the obstacle in some other manner.

In some embodiments, the obstacle data for each of the plurality of obstacles 310 is compressed according to a bit packing compression algorithm. The bit packing compression algorithm reduces the amount of data that is stored for a given value by representing large strings of data as individual bits (1 or 0) within a string, and the order of the individual bits within the string defines the meaning of the bit. For example, a bit-wise format may be employed where a 1-bit header is followed by a known number of bits representing the value. If the bit header is set (1), then the following value is encoded using 16 bits. If the bit header is unset (0), then the following value is encoded using 32 bits. In this example, large strings of data that include an initial sub-string of leading zeros can be stored in 16-bit values, so that the leading zeros do not have to be individually stored in memory. By using the bit packing algorithm to compress the obstacle data, a size of the obstacle data that is stored in memory may be further reduced.

Returning to FIG. 2, note that obstacle data for an obstacle may be stored in both the vector tile database 214 and the obstacle database 218 to allow for efficient and flexible transfer of obstacle data for different rendering operations. For example, the data blob 213 stored in the vector tile database 214 may be used to render an obstacle symbol for the obstacle 206 in the vector tile 210. Further, the map application program 208 may receive obstacle data 216 from the obstacle database 218. The obstacle data 216 defines obstacle-related information (e.g., height, type, lighting status) 217 that may be rendered in the map view 202 by the map application program 208 upon an obstacle being selected via user input or based on other operating conditions.

In some embodiments, the different vector tile and obstacle databases may be associated with different layers that may be selectively rendered in the map view 202. In some embodiments, additional layers may be selectively rendered in the map view 202, such as a topographical layer, a weather layer, a thermal layer, an air traffic layer, or another type of layer. In some embodiments, data associated with the different layers may be stored in additional databases that are not shown. In other embodiments, vector data and obstacle data may be stored in the same database.

In some embodiments, obstacle data for different obstacles may be sorted in the obstacle database 218 from tallest to shortest. Sorting obstacle data for the plurality of obstacles by height allows for the map application program 208 to efficiently query for obstacles, such as to display obstacle-related information in the map view 202. In particular, the map application program 208 may perform a height-based query to find one or more obstacles without having to traverse every obstacle in the obstacle database 218. For example, the map application program 208 may query the obstacle database 218 for obstacles only having a height over 200'. Once the query reaches an obstacle that is 199', no other obstacles in the obstacle database 218 need to be examined to satisfy the query. In this manner, the obstacle database may be queried in an efficient matter that reduces consumption of computer resources.

In some embodiments, the vector tile database 214 and the obstacle database 218 may be stored in memory of the computer 200. In other embodiments, the vector tile database 214' and the obstacle database 218' may be stored in memory of a remote computer 220 communicatively coupled with the computer 200 via a computer network 222. In such embodiments, the map application program 208 may receive vector tiles from the vector tile database 214' and obstacle data from the obstacle database 218'. For example, the vector tile database 214 and the obstacle database 218 may be stored remotely in scenarios where the computer 200 has limited storage resources, and the remote computer 220 may function to augment the local storage resources of the computer 200.

The map application program 208 may be configured to render the map view 202 for visual presentation via a display 224 associated with the computer 200. In some embodiments, the display 224 may be integral with the computer, such as the tablet computer shown in FIG. 1. In some embodiments, the display 224 may be a peripheral or remote display communicatively coupled with the computer 200.

The map view 202 includes the geographic region 204 represented by one or more vector tiles including vector tile 210 and indicates one or more obstacles including obstacle 206. Each obstacle is located in a geographic sub-region represented by a corresponding vector tile. Each obstacle may be visually represented in the map view 202 via a corresponding symbol.

The geographic region 204 visually presented in the map view 202 may be set in any suitable manner. In some examples, the geographic region 204 may be set based on user input (e.g., panning or zooming a map, globe, or other visual representation). In some examples, the geographic regions 204 may be set based on a flight path of an aircraft. In some examples, the geographic regions 204 may be set based on a current position of aircraft along the flight path.

In some embodiments, the map application program 208 may be configured to render a digital globe model layered with a plurality of vector tiles that indicate obstacles located in geographic sub-regions corresponding to each of the plurality of vector tiles in the map view 202.

In some embodiments, the map application program 208 may be configured to receive user input indicating selection of an obstacle in the map view 202. The map application program 208 may be configured to in response to selection of the obstacle, render from obstacle data for the selected obstacle obstacle-related information including one or more of an obstacle height, an obstacle type, and an obstacle lighting status for the selected obstacle in the map view 202. For example, the obstacle-related information may be visually presented in an overlay, such as the overlay 118 shown in FIG. 1. The obstacle-related information may be visually presented in the map view 202 in any suitable manner.

In some embodiments, the computer 200 may be configured to render the map view 202 via a computer service or another type of computer program in addition to or instead of the map application program 208.

The combination of using pre-rendered vector tiles and the data size reduction achieved through defining obstacle locations relative to vector tile origins reduces the memory and computation resources used to display obstacle data in a computer-generated map view. For example, a database of obstacles having locations defined in terms of a conventional geospatial format may consume more than 4.5 Gigabytes of memory. In contrast, a database of obstacles having locations defined in terms of local vector tile origins and using the compression techniques discussed herein may consume less than 1 Gigabyte of memory.

Figure 6:
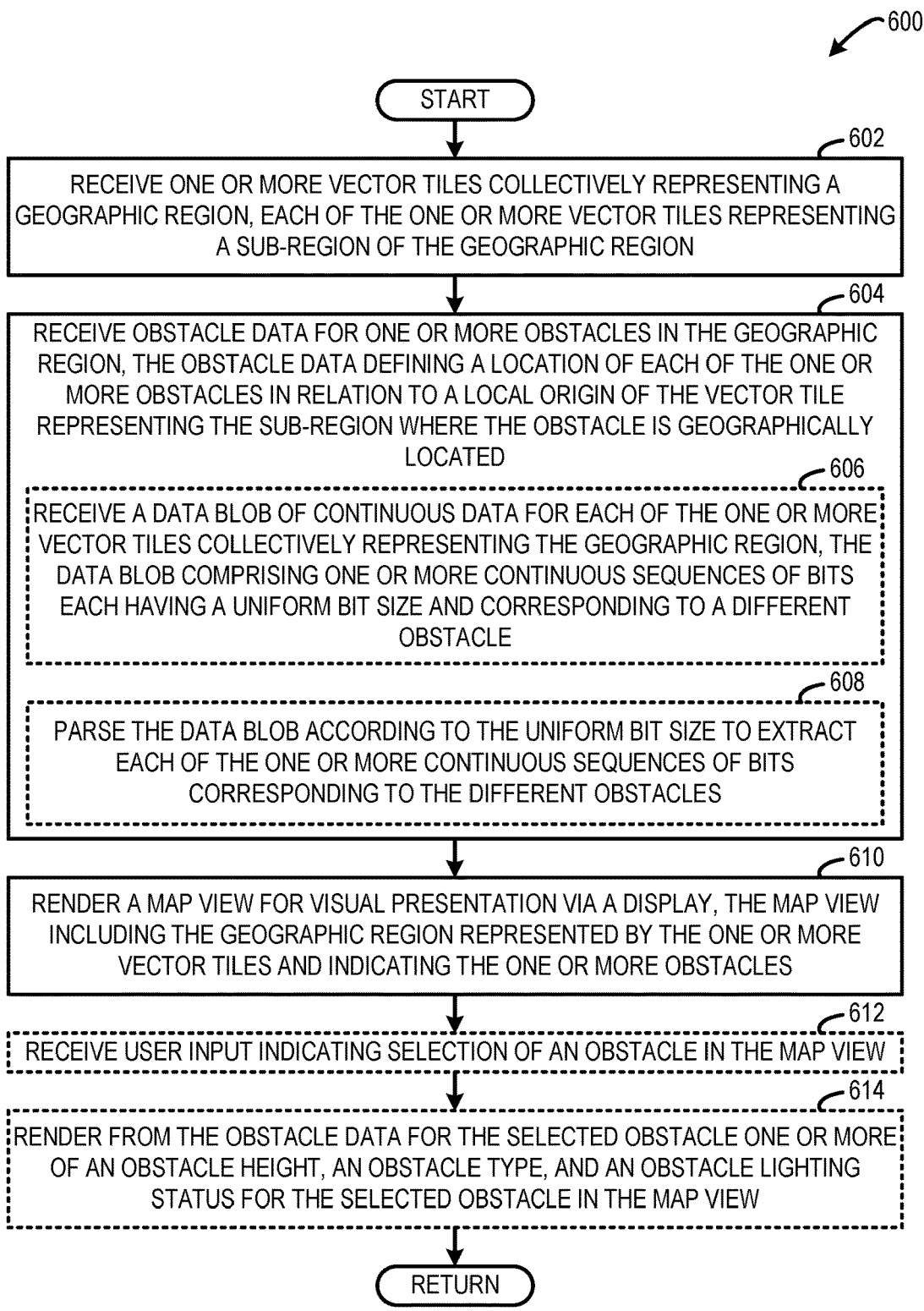
FIG. 6 is a flowchart of an example embodiment of a computer-implemented method for rendering a map view of a geographic region and indicating one or more obstacles.

FIG. 6 is a flowchart of an example embodiment of a computer-implemented method 600 for rendering a map view of a geographic region and indicating one or more obstacles. For example, the method 600 may be performed by the computer 100 shown in FIG. 1, the computer 200 shown in FIG. 2, or the computer 700 shown in FIG. 7.

At 602, the computer-implemented method 600 includes receiving one or more vector tiles collectively representing a geographic region. Each of the one or more vector tiles represent a sub-region of the geographic region.

At 604, the computer-implemented method 600 includes receiving obstacle data for one or more obstacles in the geographic region. The obstacle data defines a location of each of the one or more obstacles in relation to a local origin of the vector tile representing the sub-region where the obstacle is geographically located. In some embodiments, for each of the one or more obstacles, the location of the obstacle may be defined by a pair of coordinate delta values that are relative to the local origin of the corresponding vector tile. In some embodiments, for each of the one or more obstacles, each coordinate delta value may be normalized along an axis of the corresponding vector tile.

In some embodiments, at 606, the computer-implemented method 600 optionally may include receiving a data blob of continuous data for each of the one or more vector tiles collectively representing the geographic region. The data blob comprises one or more continuous sequences of bits each having a uniform bit size and corresponding to a different obstacle. In some embodiments, the obstacle data optionally may be compressed according to a bit packing compression algorithm.

In some embodiments, at 606, the computer-implemented method 600 optionally may include parsing the data blob according to the uniform bit size to extract each of the one or more continuous sequences of bits corresponding to the different obstacles.

At 610, the computer-implemented method 600 includes rendering a map view for visual presentation via a display. The map view includes the geographic region represented by the one or more vector tiles and indicates the one or more obstacles.

In some embodiments, at 612, the computer-implemented method 600 optionally may include receiving user input indicating selection of an obstacle in the map view. At 614, the computer-implemented method 600 optionally may include rendering from the obstacle data for the selected obstacle one or more of an obstacle height, an obstacle type, and an obstacle lighting status for the selected obstacle in the map view.

According to the computer-implemented method, the locations of the obstacles are defined locally relative to the corresponding vector tiles in order to reduce the size of the numerical values representing these locations relative to obstacle locations that are defined in terms of a geospatial format (e.g., defined in terms of latitude and longitude). Moreover, defining the locations of the obstacles in this manner allows for suitable location precision of obstacles to be maintained in order to accurately position obstacles in the map view. In some examples, the computer-implemented method may be leveraged to render large-scale data sets of obstacles in a map view so that the obstacles may be identified and avoided by an aircraft flying along a flight path that is visually presented in the map view.

In some embodiments, the methods and processes described herein may be tied to a computing system of one or more computing devices. In particular, such methods and processes may be implemented as an executable computer-application program, a network-accessible computing service, an application-programming interface (API), a library, or a combination of the above and/or other computer resources.

Figure 7:
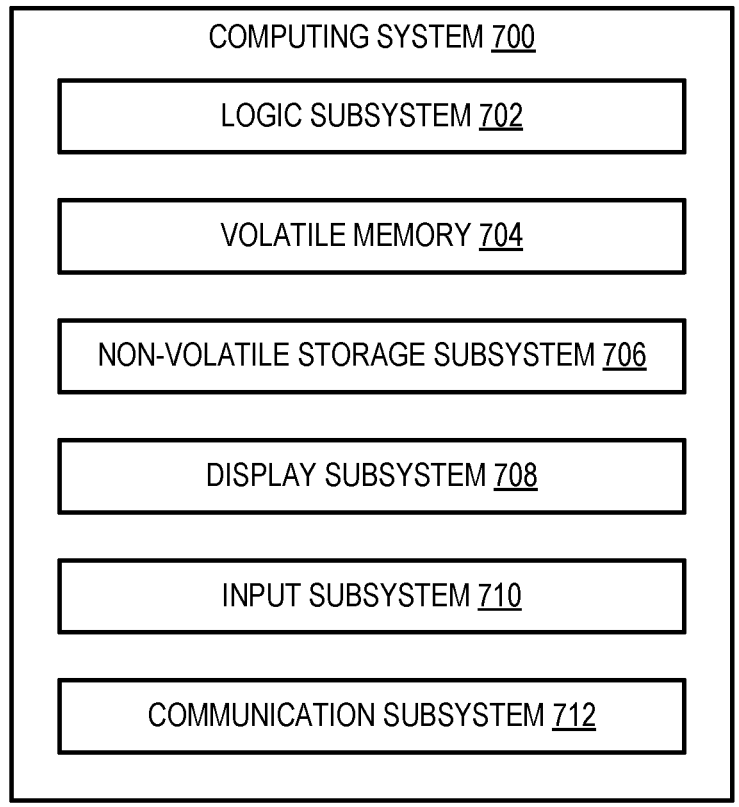
FIG. 7 shows a block diagram of an example embodiment of a computing system.

FIG. 7 shows an example computing system 700 that is configured to perform efficient rendering of obstacle data in a map view as described-herein. For example, the computing system 700 may represent the computer 100 shown in FIG. 1, the computer 200 shown in FIG. 2, or the remote computer 220 shown in FIG. 2. The computing system 700 comprises one or more processors 702, one or more storage devices 704. The computing system 700 includes one or more physical devices. In some examples, the computing system 700 includes a plurality of networked computing devices (e.g., a cluster or cloud computing system). Additionally, the computing system 700 optionally may comprise a display 706, an input device 708, and a communication interface 710.

The one or more processors 702 are configured to execute instructions stored in the one or more storage devices 704. For example, the one or more processors 702 can execute instructions that are part of one or more tools, applications, services, programs, routines, libraries, objects, components, data structures, or other logical constructs. The one or more processors 702 can be configured to execute software instructions. Additionally, or alternatively, the one or more processors 702 can be configured to execute hardware or firmware instructions. The processors 702 can be single-core or multi-core, and the instructions executed thereon can be configured for sequential, parallel, and/or distributed processing.

The one or more processors 702 are communicatively coupled with the one or more storage devices 704. The one or more storage devices 704 may include physical devices that are removable and/or built-in. The one or more storage devices 704 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. The one or more storage devices 704 may include nonvolatile, dynamic, static, read/write, read-only, sequential-access, location-addressable, file-addressable, and/or content-addressable devices. The one or more storage devices 704 may further include physical devices that include random-access memory. The random-access memory may be utilized by the one or more processors 702 to temporarily store information during processing of software instructions.

Aspects of the one or more processors 702 and the one or more storage devices 704 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, the display 706 can include one or more display devices utilizing virtually any type of technology. Such display devices can be combined with the computing system 700 in a shared enclosure, or such display devices can be peripheral display devices. The display 706 may be configured to visually present a map view of a geographic region including one or more obstacles and optionally including various obstacle information describing the one or more obstacles.

When included, the input device 708 includes or interfaces with one or more devices configured to translate human actions into computer-understandable information. Nonlimiting examples of input devices include a keyboard, mouse, track pad, button, dial, touchscreen, and/or computer interface (e.g., serial or universal serial bus) for interfacing with peripheral input devices. In some embodiments, the input device 708 can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or camera for machine vision and/or gesture recognition.

The communication interface 710 is configured to communicate data between the computing system 700 and a remote computing system via a computer network such that the computing system 700 and the remote computing system are communicatively coupled. The communication interface 710 includes wired and/or wireless communication devices compatible with one or more different communication protocols. As non-limiting examples, the communication interface 710 can be configured for communication via a wireless telephone network, or a wired or wireless local- or wide-area network.

In an example, a computer comprises a processor, a computer-readable storage device holding instructions executable by the processor to receive one or more vector tiles collectively representing a geographic region, each of the one or more vector tiles representing a sub-region of the geographic region, receive obstacle data for one or more obstacles in the geographic region, the obstacle data defining a location of each of the one or more obstacles in relation to a local origin of the vector tile representing the sub-region where the obstacle is geographically located, and render a map view for visual presentation via a display, the map view including the geographic region represented by the one or more vector tiles and indicating the one or more obstacles. In this example and/or other examples, for each of the one or more obstacles, the location of the obstacle optionally may be defined by a pair of coordinate delta values that are relative to the local origin of the corresponding vector tile. In this example and/or other examples, for each of the one or more obstacles, each coordinate delta value optionally may be normalized along an axis of the corresponding vector tile. In this example and/or other examples, for each of the one or more obstacles, the obstacle data optionally may be compressed according to a bit packing compression algorithm. In this example and/or other examples, receiving the obstacle data optionally may include receiving a data blob of continuous data for each of the one or more vector tiles collectively representing the geographic region, the data blob comprising one or more continuous sequences of bits each having a uniform bit size and corresponding to a different obstacle. In this example and/or other examples, the instructions optionally may be executable by the processor to parse the data blob according to the uniform bit size to extract each of the one or more continuous sequences of bits corresponding to the different obstacles. In this example and/or other examples, the instructions optionally may be executable by the processor to receive user input indicating selection of an obstacle in the map view, and render from the obstacle data for the selected obstacle one or more of an obstacle height, an obstacle type, and an obstacle lighting status for the selected obstacle in the map view. In this example and/or other examples, the obstacle data optionally may further define an obstacle height. In this example and/or other examples, the obstacle data for the one or more obstacles optionally may be received from an obstacle database storing obstacle data for a plurality of obstacles sorted in the database from tallest to shortest. In this example and/or other examples, the obstacle data optionally may further define an obstacle type. In this example and/or other examples, the obstacle data optionally may further define an obstacle lighting status. In this example and/or other examples, each of the one or more vector tiles optionally may include vector data defining a relative location of the vector tile in relation to the plurality of vector tiles and a zoom level of the vector tile, and the one or more vector tiles optionally may be rendered in the map view based on the vector data.

In another example, a computer-implemented method comprises receiving one or more vector tiles collectively representing a geographic region, each of the one or more vector tiles representing a sub-region of the geographic region, receiving obstacle data for one or more obstacles in the geographic region, the obstacle data defining a location of each of the one or more obstacles in relation to a local origin of the vector tile representing the sub-region where the obstacle is geographically located, and rendering a map view for visual presentation via a display, the map view including the geographic region represented by the one or more vector tiles and indicating the one or more obstacles. In this example and/or other examples, for each of the one or more obstacles, the location of the obstacle optionally may be defined by a pair of coordinate delta values that are relative to the local origin of the corresponding vector tile. In this example and/or other examples, for each of the one or more obstacles, each coordinate delta value optionally may be normalized along an axis of the corresponding vector tile. In this example and/or other examples, for each of the one or more obstacles, the obstacle data optionally may be compressed according to a bit packing compression algorithm. In this example and/or other examples, receiving the obstacle data optionally may include receiving a data blob of continuous data for each of the one or more vector tiles collectively representing the geographic region, the data blob comprising one or more continuous sequences of bits each having a uniform bit size and corresponding to a different obstacle. In this example and/or other examples, the computer-implemented method optionally may further comprise parsing the data blob according to the uniform bit size to extract each of the one or more continuous sequences of bits corresponding to the different obstacles. In this example and/or other examples, the computer-implemented method optionally may further comprise receiving user input indicating selection of an obstacle in the map view, and rendering from the obstacle data for the selected obstacle one or more of an obstacle height, an obstacle type, and an obstacle lighting status for the selected obstacle in the map view.

In yet another example, a computer comprises a processor, a computer-readable storage device holding instructions executable by the processor to receive one or more vector tiles collectively representing a geographic region, each of the one or more vector tiles representing a sub-region of the geographic region, receive obstacle data for one or more obstacles in the geographic region, the obstacle data defining a location of each of the one or more obstacles by a pair of coordinate delta values that are relative to a local origin of the vector tile representing the sub-region where the obstacle is geographically located, each coordinate delta value normalized along an axis of the corresponding vector tile, and render a map view for visual presentation via a display, the map view including the geographic region represented by the one or more vector tiles and indicating the one or more obstacles.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A computing system comprising:
a processor;
a computer-readable storage device holding instructions executable by the processor to:
receive one or more vector tiles collectively representing a geographic region, each of the one or more vector tiles representing a sub-region of the geographic region;
receive obstacle data for one or more obstacles in the geographic region, wherein the obstacle data defines a location of each of the one or more obstacles in relation to a local origin of the vector tile representing the sub-region where the obstacle is geographically located, wherein the obstacle data includes a data blob of continuous data for each vector tile of the one or more vector tiles collectively representing the geographic region, wherein each data blob comprises a continuous sequences of bits collectively representing at least location data for obstacles located in the vector tile;
for each data blob, parse the data blob according to a uniform bit size to extract the location data for each obstacle located in the vector tile; and
render a map view for visual presentation via a display, the map view including the geographic region represented by the one or more vector tiles and indicating the one or more obstacles.

2. The computing system of claim 1, wherein, for each of the one or more obstacles, the location of the obstacle is defined by a pair of coordinate delta values that are relative to the local origin of the corresponding vector tile.

3. The computing system of claim 2, wherein, for each of the one or more obstacles, each coordinate delta value is normalized along an axis of the corresponding vector tile.

4. The computing system of claim 1, wherein, for each of the one or more obstacles, the obstacle data is compressed according to a bit packing compression algorithm.

5. The computing system of claim 1, wherein the instructions are executable by the processor to:
receive user input indicating selection of an obstacle in the map view; and
render from the obstacle data for the selected obstacle one or more of an obstacle height, an obstacle type, and an obstacle lighting status for the selected obstacle in the map view.

6. The computing system of claim 1, wherein the obstacle data further defines an obstacle height.

7. The computing system of claim 6, wherein the obstacle data for the one or more obstacles is received from an obstacle database storing obstacle data for a plurality of obstacles sorted in the database from tallest to shortest.

8. The computing system of claim 1, wherein the obstacle data further defines an obstacle type.

9. The computing system of claim 1, wherein the obstacle data further defines an obstacle lighting status.

10. The computing system of claim 1, wherein each of the one or more vector tiles includes vector data defining a relative location of the vector tile in relation to the plurality of vector tiles and a zoom level of the vector tile, and wherein the one or more vector tiles are rendered in the map view based on the vector data.

11. The computing system of claim 1, wherein the location data for each obstacle includes a pointer to an externally stored data blob of location data for the obstacle.

12. The computing system of claim 1, wherein different obstacles in the geographic region are represented in the map view with different symbols based at least on the height of the obstacle being greater than or less than a threshold height.

13. A computer-implemented method comprising:
receiving one or more vector tiles collectively representing a geographic region, each of the one or more vector tiles representing a sub-region of the geographic region;
receiving obstacle data for one or more obstacles in the geographic region, wherein the obstacle data defines a location of each of the one or more obstacles in relation to a local origin of the vector tile representing the sub-region where the obstacle is geographically located, wherein the obstacle data includes a data blob of continuous data for each vector tile of the one or more vector tiles collectively representing the geographic region, wherein each data blob comprises a continuous sequences of bits collectively representing at least location data for obstacles located in the vector tile;
for each data blob, parsing the data blob according to a uniform bit size to extract the location data for each obstacle located in the vector tile; and
rendering a map view for visual presentation via a display, the map view including the geographic region represented by the one or more vector tiles and indicating the one or more obstacles.

14. The computer-implemented method of claim 13, wherein, for each of the one or more obstacles, the location of the obstacle is defined by a pair of coordinate delta values that are relative to the local origin of the corresponding vector tile.

15. The computer-implemented method of claim 14, wherein, for each of the one or more obstacles, each coordinate delta value is normalized along an axis of the corresponding vector tile.

16. The computer-implemented method of claim 13, wherein, for each of the one or more obstacles, the obstacle data is compressed according to a bit packing compression algorithm.

17. The computer-implemented method of claim 13, further comprising:
receiving user input indicating selection of an obstacle in the map view; and
rendering from the obstacle data for the selected obstacle one or more of an obstacle height, an obstacle type, and an obstacle lighting status for the selected obstacle in the map view.

18. The computer-implemented method of claim 13, wherein the location data for each obstacle includes a pointer to an externally stored data blob of location data for the obstacle.

19. The computer-implemented method of claim 13, wherein different obstacles in the geographic region are represented in the map view with different symbols based at least on the height of the obstacle being greater than or less than a threshold height.

20. A computing system comprising:
a processor;
a computer-readable storage device holding instructions executable by the processor to:
receive one or more vector tiles collectively representing a geographic region, each of the one or more vector tiles representing a sub-region of the geographic region;
receive obstacle data for one or more obstacles in the geographic region, wherein the obstacle data defines a location of each of the one or more obstacles by a pair of coordinate delta values that are relative to a local origin of the vector tile representing the sub-region where the obstacle is geographically located, each coordinate delta value normalized along an axis of the corresponding vector tile, wherein the obstacle data includes a data blob of continuous data for each vector tile of the one or more vector tiles collectively representing the geographic region, wherein each data blob comprises a continuous sequences of bits collectively representing at least the pair of coordinate delta values that are relative to the local origin of the vector tile each obstacle located in the vector tile;
for each data blob, parse the data blob according to a uniform bit size to extract the pair of coordinate delta values that are relative to the local origin of the vector tile for each obstacle located in the vector tile; and
render a map view for visual presentation via a display, the map view including the geographic region represented by the one or more vector tiles and indicating the one or more obstacles.

* * * * *